United States Patent [19]

Grolig et al.

[11] Patent Number: 4,952,258

[45] Date of Patent: Aug. 28, 1990

[54] PROCESS FOR PRODUCING LAMINATED SAFETY GLASS

[75] Inventors: Gerhard Grolig, Moerfelden-Walldorf; Peter Boening, Wiesbaden; Manfred Kuechler, Oberursel; Guenter Reinhard, Frankfurt am Main, all of Fed. Rep. of Germany

[73] Assignee: Hoechst Aktiengesellschaft, Frankfurt am Main, Fed. Rep. of Germany

[21] Appl. No.: 347,060

[22] Filed: May 4, 1989

[30] Foreign Application Priority Data

Feb. 13, 1989 [DE] Fed. Rep. of Germany ....... 3904191

[51] Int. Cl.$^5$ .................. B32B 31/12; B32B 17/10
[52] U.S. Cl. .................. 156/99; 156/100; 156/102; 156/106; 156/277
[58] Field of Search .................. 156/99, 100, 102, 106, 156/277

[56] References Cited

U.S. PATENT DOCUMENTS 4,445,953  5/1984  Hawk .................. 156/102

FOREIGN PATENT DOCUMENTS 0077672  4/1983  European Pat. Off. .

*Primary Examiner*—Robert A. Dawson
*Attorney, Agent, or Firm*—Foley & Lardner, Schwartz, Jeffery, Schwaab, Mack, Blumenthal & Evans

[57] ABSTRACT

A process for producing laminated safety glass is disclosed, comprising depositing a film which comprises at least one function layer on a plastic sheet, inserting the sheet between a plurality of further layers, such as two polyvinylbutyral sheets which are in turn enclosed by glass panes, such that the plastic sheet projects beyond the edges of the other layers, clamping the plastic sheet along its projecting sections, and laminating the layers. A clamping device for performing the process and a laminated safety glass produced by the process are also disclosed.

6 Claims, 2 Drawing Sheets

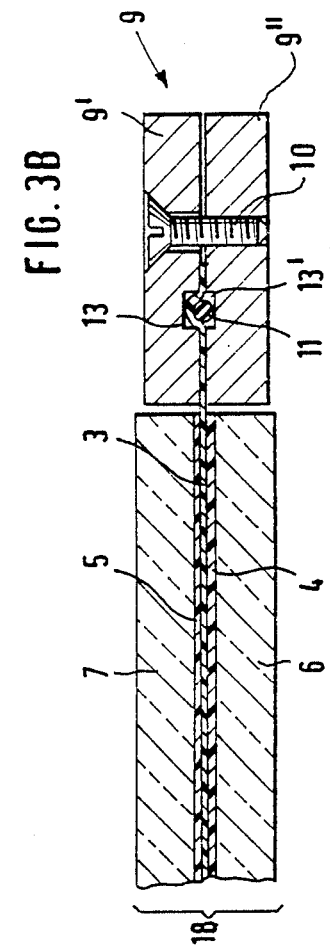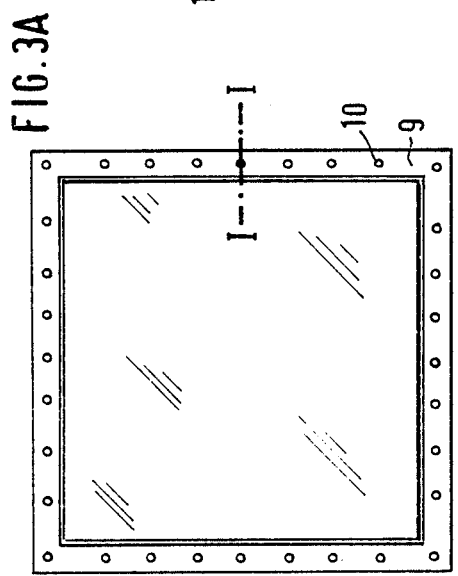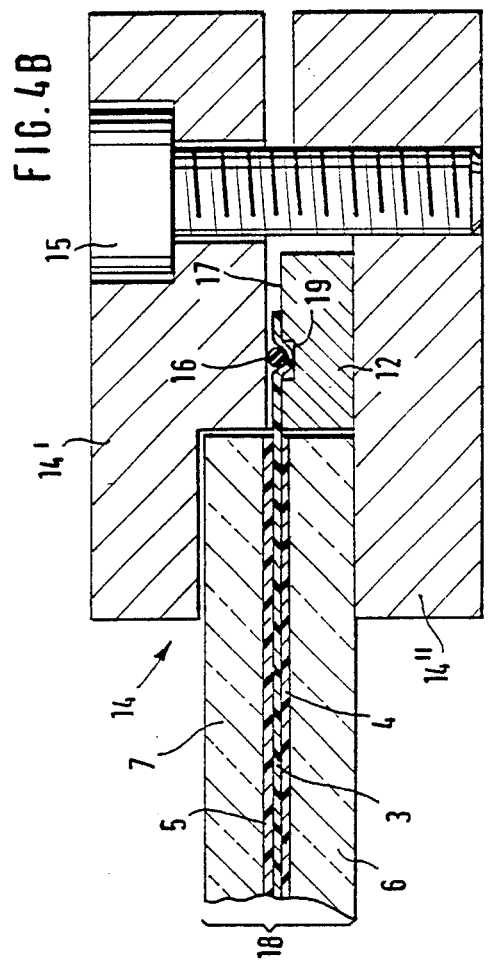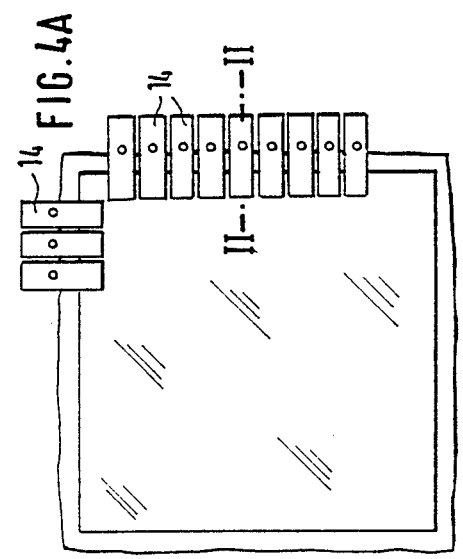

PROCESS FOR PRODUCING LAMINATED SAFETY GLASS

BACKGROUND OF THE INVENTION

The invention relates to a process for producing laminated safety glass composed of a plurality of layers, at least one of which is a function layer. The invention further relates to a device for performing the process, and to a laminated safety glass produced by the process.

Laminated safety glass is one of the glazing materials frequently used today. For example, a large proportion of motor vehicle windshields is composed of laminated safety glass. Laminated safety glass is also used in glazing buildings.

In general, the standard laminated safety glass of today is composed of three layers, two glass panes being joined to each other by a sheet of polyvinylbutyral. Such glass laminates offer a high measure of safety since, in the event of an impact loading, the sheet of polyvinylbutyral elastically absorbs mechanical energy, and glass splinters which may be produced remain stuck to the sheet.

The requirements which are nowadays imposed on laminated safety glass are not, however, limited to the safety aspect. On the contrary, in many cases it is desirable for laminated safety glasses of this type to fulfill additional functions. It may, for example, be necessary for the pane of laminated safety glass to offer a special heat protection or protection against strong solar radiation. Further requirements, which are imposed, for example, specifically on motor vehicle windshields, are the capability of being electrically heated and the possibility of incorporating so-called overhead displays.

One possibility for equipping laminated safety glass with additional functions is to integrate thin layers into the glass laminate. This can be done by depositing one or more function layers on that side of one of the two glass panes which faces the polyvinylbutyral sheet in the subsequent lamination process. To coat individual glass panes is very complicated and expensive. In producing windshields for motor vehicles, there is the additional difficulty that the coated, initially flat pane also has to pass through a bending process while being heated, and this easily leads to tearing of the function layers. In this critical operational step, the yield is only low.

It is cheaper to integrate thin function layers into the glass laminates by first depositing the layers in a continuous process on a high-transparency substrate sheet and then incorporating the coated substrate sheet into the glass laminate.

A suitable material for the substrate sheet is polyethylene terephthalate. The coated substrate sheet is embedded between two sheets of polyvinylbutyral and laminated safety glass panes are thus produced which have the structure: glass/PVB sheet/(coated sheet)/PVB sheet/glass. If commercially available polyethylene terephthalate sheets are used, the coated substrate sheet is observed to form corrugations in the finished glass laminates. This has such a disturbing effect on the appearance of the glass laminates and the freedom from distortion of the incident light that use of the glass laminates is out of the question.

European Patent No. 0,077,672 proposes a solution to this problem. The essential idea in this case is that only those polyethylene terephthalate sheets which have very specific thermomechanical properties are used as substrate sheet. This means that the thermal shrinkage E of a sheet and its thickness d fulfil the following relationships:

$$4.4 \geq E \geq 0.00028 \times (d-128)^2 \quad (1)$$

$$d < 125 \quad (2)$$

Here E stands for the thermal shrinkage measured in % which sets in after a 30-minute temperature stressing of 120° C., and d for the sheet thickness measured in $\mu$m. The reason for the restriction of the permitted thermal shrinkage to the interval specified in (1) is that, on the one hand, a higher shrinkage results in damage to the function layer and on the other hand, the small flatness faults which always occur in the sheet can no longer be smoothed out with a lower shrinkage.

It was found, however, that it is difficult to produce glass laminates which have a satisfactory appearance even with substrate sheets which fulfil the two relationships (1) and (2). In particular, sheets which fall into the boundary range of the region of the E-d plane defined by the relationships (1) and (2) result in a damaged function layer or in flatness faults in the glass laminates.

The specification (1) implies that the thinner the sheet is, the more accurately the shrinkage of the sheet has to be adjusted. For sheets having a thickness of $d=12$ $\mu$m, (1) and (2) yield, for example, a shrinkage in the range $4.4 \geq E \geq 3.7$. Sheets having a thickness of $d=2.6$ $\mu$m and less are excluded from the application by (1). In the patent mentioned, the range $$3.9 \geq E \geq 0.00028 \times (d-130)^2 \quad (3)$$
$$d < 125$$

is described as particularly favorable. Even sheets having a thickness of d less than or equal to 12 $\mu$m are excluded from the application by (3).

SUMMARY OF THE INVENTION

Accordingly, it is an object of the present invention to provide a process for producing laminated safety glass with at least one additional function layer on a substrate sheet, in which the substrate sheet is not subject to any restrictions in relation to the thermal shrinkage during the lamination of the individual layers to form the laminated safety glass.

Another object of the present invention is to provide a laminated safety glass which is equipped with at least one function layer.

A further object of the present invention is to provide a device for performing the above-described process.

In accomplishing the foregoing objectives, there has been provided, in accordance with one aspect of the present invention, a process for producing laminated safety glass comprising a plurality of layers, at least one of which is a function layer, which comprises the steps of providing a plastic sheet layer, depositing a film on the plastic sheet layer, inserting the plastic sheet layer between a plurality of further layers such that the plastic sheet layer projects beyond the edges of the further layers, clamping the plastic sheet layer along its projecting sections, and laminating the layers while the plastic sheet layer remains clamped to form the laminated safety glass. The deposited film may comprise one or several function layers.

In accordance with another aspect of the present invention there is provided a laminated safety glass produced by the above-described process.

In accordance with still another aspect of the present invention, there is provided a clamping device for carrying out the above-described process which comprises a plurality of members, between which members the projecting plastic sheet layer is clamped on all four sides.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention is described in more detail below with reference to the drawings. In these:

FIG. 3A shows a plan view of a frame as clamping device for the coated plastic sheet of the glass-sheet laminate, FIG. 3B shows a section along the line I—I in FIG. 3A, FIG. 4A shows a plan view of a chain of tongs as clamping device for the coated plastic sheet of the glass-sheet laminate, FIG. 4B shows a section along the line II—II in FIG. 4A.

DETAILED DESCRIPTION OF PREFERRED EMBODIMENTS

In an embodiment of the process of the present invention, the plastic sheet layer is clamped in the flat position on all four sides thereof while a compaction pressure is applied to the stack of layers which is joined together to form the glass laminate, while the stack is moving through means for applying the compaction pressure. It is equally possible for the plastic sheet to be clamped in a spherically curved area of the plastic sheet on all four sides of the plastic sheet while a compaction pressure is applied to the stack of layers. In an embodiment of the process, the clamping of the plastic sheet layer is maintained during the final process step for finishing the laminated safety glass in which pressure and heat act on the glass prelaminate.

The plastic sheet layer is coated by sputtering, vacuum vapor deposition, printing or wet coating with a film which is composed of one or more function layers.

The advantage of the invention is that, in choosing the substrate sheet, it is no longer necessary to take account of the fact that its thermomechanical properties have to fulfil very narrowly set specifications. On the contrary, from the point of view of the thermomechanical properties, the selection of the substrate sheet is substantially free.

Figure 1:
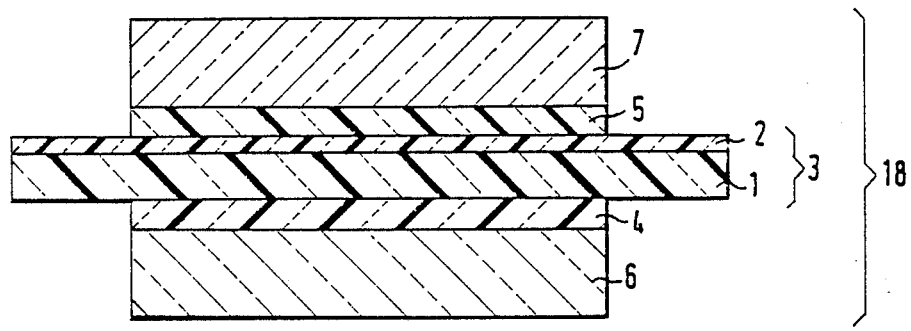
FIG. 1 shows a section through the layers of a glass-sheet laminate according to the invention.

Referring now to the drawings, the section in FIG. 1 shows a laminated safety glass which is composed of a glass/polyvinylbutyral sheet/plastic sheet comprising function layer/polyvinylbutyral sheet/glass laminate. The coated plastic sheet layer 3, comprising a substrate sheet 1 and one or more function layers 2, projects beyond the edge of the other layers of the laminate 18, which here are the polyvinylbutyral sheets 4, 5 in contact with both sides of the plastic sheet layer 3 and also the glass panes 6 and 7 adjacent thereto.

The material of the substrate sheet 1 is polyethylene terephthalate, polyamide or polyether sulfone. For the substrate sheet, use is made, for example, of a sheet composed of polyethylene terephthalate (Hostaphan 4400 produced by Hoechst AG) having a thickness of 36 $\mu$m which is coated with a light-transparent, heat-reflecting film 2 in a cathode sputtering plant. The light-transparent and heat-reflecting film 2 is composed, for example, of two metal layers and two dielectric layers and has the following structure:

Dielectric layer/Ag/metallic indium-tin oxide/dielectric layer

Tin oxide or tin oxynitride in the form $SnO_2$ or $SnO_xN_y$ respectively with $1 \leq x \leq 2$ and $0 \leq y \leq 1$ can be used as the dielectric layer.

Figure 2:
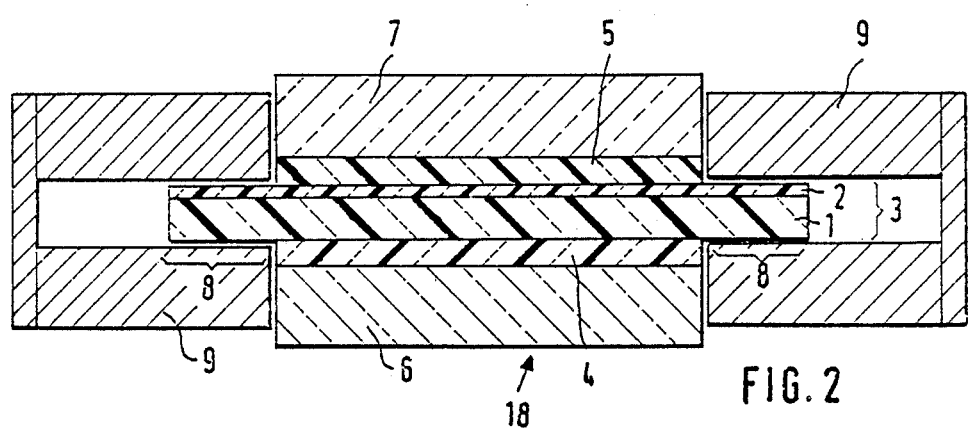
FIG. 2 shows, diagrammatically in section, the clamping of the glass-sheet laminate in a clamping device.

FIG. 2 shows diagrammatically the clamping of the projecting plastic sheet layer 3 by a flat frame 9. The plastic sheet layer 3 projects at every side by a part 8 beyond the edges of the PVB sheets 4, 5 and the glass panes 6, 7. The projecting edges or parts 8 of the coated plastic sheet layer 3 are clamped by the frame 9 and fixed in the latter.

FIGS. 3A and 3B show a plan and a section, respectively, through a two-part clamping device in the form of a frame 9 composed of upper member 9' and lower member 9" joined to each other by a plurality of screws 10. In each of the two members 9' and 9" there is a peripheral groove 13, 13' in the faces of the members facing each other. In the screwed-together state of the two members 9' and 9", these two grooves 13, 13' are brought to registration and accommodate an O-ring 11. The coated plastic sheet wraps round the O-ring along a partial circumference, the O-ring securely clamping the plastic sheet in the upper groove 13. The thickness of the frame 9 is less than the total thickness of the laminate 18, with the result that the laminate 18 together with the frame 9 can pass through a roller system, which is not shown, for producing the glass prelaminate, as is known in the prior art. In the roller system, the laminate 18 is heated to about 90° C. while a compaction pressure is exerted. After passing through the roller system, the glass prelaminate together with the frame 9 is placed in an autoclave in which the final laminate 18 or the laminated safety glass is produced under pressure and at a temperature of up to 140° C.

During heating, the clamped plastic sheet layer 3 expands and this produces a corrugation formation which has, however, completely disappeared after completion of the laminating process. During cooling down, the frame 9 exerts, on the edges of the plastic sheet layer 3, a tensile stress which completely smooths the contracting plastic sheet, with the result that no corrugations of any size can be detected in the finished laminated safety glass pane. The finished laminated safety glass panes consequently comprise an additional function layer which, for example, increases the heat reflection without impairing the light transparency, and have a perfect appearance.

Examples of further function layers include radio antennas, transparent and electrically heatable layers, transparent electrodes for displays and the like.

FIGS. 4A and 4B show a plan view and a section along the line II—II in FIG. 4A of a clamping device 14 which is composed of a plurality of tongs disposed next to each other. The tongs form rows of tongs along the edges of the laminate 18. Each tong comprises an upper outside member 14', a lower outside member 14" and an inside member 12, which are held together by a screw 15. The two outside members 14' and 14" grip the laminate 18 at the edges, and the height or thickness of the tongs 14 exceeds the thickness of the laminate 18. Tongs 14 of this type are used instead of a flat frame for the application case in which the laminated safety glass pane to be produced is spherically curved.

Figure 5:
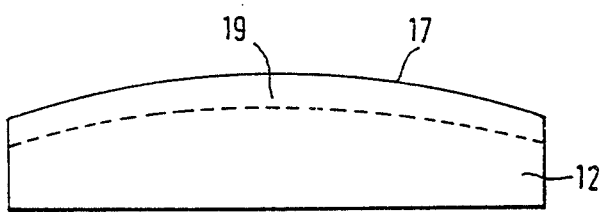
FIG. 5 shows an interior part of the holding device according to FIG. 4B.

As is apparent from FIG. 5, the inside member 12 has a convex upper side 17 into which a groove 19 is sunk which accommodates an O-ring. The base surface of the groove 19 runs with the same curvature as the convex upper side, and this is indicated in FIG. 5 by the broken line. Clamped between the O-ring 16 and the base surface of the groove 19 is the plastic sheet layer 3, as is apparent from the section in FIG. 4B.

The glass prelaminates composed of spherically curved laminates 18 are produced by placing the laminates together with the rows of clamps in a vacuum sack which is situated in an oven and from which air is pumped out. During this process, the vacuum sack, which is composed, for example, of polypropylene or similar material, fits tightly against the laminate 18 and exerts pressure, with the result that the laminate is joined together under the simultaneous action of the oven temperature and the exerted pressure to form the glass prelaminate. After the treatment in the oven, the glass prelaminate is converted to the final form of the laminated safety glass pane in an autoclave under the action of pressure and heat.

Flat and spherically curved laminated safety glass panes can equally be produced by the process described. Structural differences in the clamping device used in each case for the coated plastic sheet are due to the differently shaped glass panes and are not of a basic nature. Plastic laminates with the polyvinylbutyral sheet/plastic sheet comprising function layer/polyvinylbutyral sheet structure are produced by fixing the plastic sheet carrying the function layers along its edges in a clamping device during the laminating process. If the plastic laminate is produced in a platen press, a frame is used as the clamping device for the plastic sheet. In a roll to roll laminating process, the plastic sheet is held by rows of tongs.

The use of clamping devices in the production of plastic laminates and glass laminates makes it possible to use plastic sheets as substrates for the function layers which would result in a poor appearance of the laminates as a result of corrugation formation in the film of the plastic sheet without the use of clamping devices.

All highly transparent plastic sheets which have thermal shrinkage can be used. For example, sheets of polyethylene terephthalate, polyamide, polyether sulfone, etc., may be used. The thickness of the sheets is not in principle restricted by the process. The thickness of the plastic sheets used is determined solely by the requirements in practice and the processing conditions.

The function layer or layers may be a single layer or a system of layers. The function layer may be deposited by coating, printing, vacuum metallization, sputtering or the like on the substrate sheet.

What is claimed is:

1. A process for producing laminated safety glass comprising a plurality of layers, at least one of which is a function layer, which comprises the steps of providing a plastic sheet layer, depositing a film on said plastic sheet layer, inserting said plastic sheet layer between a plurality of further layers such that said plastic sheet layer projects beyond the edges of said further layers, clamping said plastic sheet layer along its projecting sections without clamping the edges of said plurality of further layers, and laminating the stack of said plurality of layers while said plastic sheet layer remains clamped.

2. The process as claimed in claim 1, further comprising the step of applying compaction pressure to said stack.

3. The process as claimed in claim 2, wherein said plastic sheet layer is clamped in a flat plane on all four sides thereof during application of said compaction pressure, and wherein said compaction pressure is applied by passing said stack through means for applying compaction pressure.

4. The process as claimed in claim 2, wherein said plastic sheet layer is disposed in a spherically curved area and is clamped on all four sides thereof during application of said compaction pressure.

5. The process as claimed in claim 2, further comprising the step of applying heat and pressure to said stack, wherein the clamping of said plastic sheet layer is maintained during said step.

6. The process as claimed in claim 1, wherein said film is deposited on said plastic sheet layer by sputtering, vacuum vapor deposition, printing, or wet coating and wherein said film is composed of one or more layers at least one of which is a function layer.

* * * * *